United States Patent
Baughman et al.

(10) Patent No.: US 11,829,886 B2
(45) Date of Patent: Nov. 28, 2023

(54) EPISTEMIC AND ALEATORIC DEEP PLASTICITY BASED ON SOUND FEEDBACK

(71) Applicant: International Business Machines Corporation, Armonk, NY (US)

(72) Inventors: Aaron K Baughman, Silver Spring, MD (US); Stephen C. Hammer, Marietta, GA (US); Micah Forster, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1639 days.

(21) Appl. No.: 15/914,222

(22) Filed: Mar. 7, 2018

(65) Prior Publication Data

US 2019/0279094 A1    Sep. 12, 2019

(51) Int. Cl.
*G06N 3/10*  (2006.01)
*G06F 17/18* (2006.01)
(Continued)

(52) U.S. Cl.
CPC .............. *G06N 3/10* (2013.01); *G06F 17/18* (2013.01); *G06N 3/043* (2023.01); *G06N 3/047* (2023.01); *G06N 3/084* (2013.01)

(58) Field of Classification Search
CPC ...... G06N 3/10; G06N 3/0436; G06N 3/0472; G06N 3/084; G06F 17/18
See application file for complete search history.

(56) References Cited

U.S. PATENT DOCUMENTS

| 5,159,660 A | 10/1992 | Lu et al. |
| 6,904,335 B2 | 6/2005 | Solomon |

(Continued)

FOREIGN PATENT DOCUMENTS

| DE | 60029325 T2 | 3/2007 |
| JP | 2016006617 A | 1/2016 |

(Continued)

OTHER PUBLICATIONS

Kendall ("What Uncertainties Do We Need in Bayesian Deep Learning for Computer Vision?") (Year: 2017).*

(Continued)

*Primary Examiner* — Kakali Chaki
*Assistant Examiner* — Su-Ting Chuang
(74) *Attorney, Agent, or Firm* — Yee & Associates, P.C.

(57) ABSTRACT

Simulating uncertainty in an artificial neural network is provided. Aleatoric uncertainty is simulated to measure what the artificial neural network does not understand from sensor data received from an object operating in a real-world environment by adding random values to edge weights between nodes in the artificial neural network during backpropagation of output data of the artificial neural network and measuring impact on the output data by the added random values to the edge weights between the nodes. Epistemic uncertainty is simulated to measure what the artificial neural network does not know by dropping out a selected node from each respective layer of the artificial neural network during forward propagation of the sensor data and measuring impact of dropped out nodes on the output data of the artificial neural network. An action corresponding to the object is performed based on the impact of simulating the aleatoric and epistemic uncertainty.

25 Claims, 6 Drawing Sheets

(51) Int. Cl.
*G06N 3/084* (2023.01)
*G06N 3/047* (2023.01)
*G06N 3/043* (2023.01)

(56) References Cited

U.S. PATENT DOCUMENTS

| | | | |
|---|---|---|---|
| 10,267,265 B2 | 4/2019 | Romet et al. | |
| 2011/0071969 A1 | 3/2011 | Doctor et al. | |
| 2011/0231356 A1 | 9/2011 | Vaidyanathan et al. | |
| 2016/0307096 A1* | 10/2016 | Goel | G06N 3/0454 |
| 2017/0124448 A1* | 5/2017 | Engel | G06F 11/008 |
| 2017/0175680 A1 | 6/2017 | Romet et al. | |
| 2017/0351966 A1* | 12/2017 | Rastogi | G01M 99/00 |
| 2018/0081330 A1 | 3/2018 | Haslett et al. | |

FOREIGN PATENT DOCUMENTS

| | | |
|---|---|---|
| JP | 2017524851 A | 8/2017 |
| WO | 2015150706 A1 | 10/2015 |
| WO | WO2016135514 A1 | 9/2016 |

OTHER PUBLICATIONS

Hernandez-Lobatoc ("Probabilistic backpropagation for scalable learning of bayesian neural networks") Proceedings of the 32nd International Conference on Machine Learning, PMLR 37:1861-1869, 2015. (Year: 2015).*

Gal ("Concrete Dropout") (Year: 2017).*

Choi ("Uncertainty-Aware Learning from Demonstration Using Mixture Density Networks with Sampling-Free Variance Modeling"). (Year: 2017).*

Nechval ("Prediction of fatigue crack growth process via artificial neural network technique") Computing, 2006, vol. 5, Issue 3, 1-12 (Year: 2006).*

Depeweg et al., "Uncertainty Decomposition in Bayesian Neural Networks with Latent Variable", Cornell University, Nov. 11, 2017, 8 pages.

Depeweg et al., "Sensitivity Analysis for Predictive Uncertainty in Bayesian Neural Networks", Cornell University, Dec. 10, 2017, 7 pages.

McClure et al., "Robustly representing uncertainty through sampling in deep neural networks", Semantic Scholar, Sep. 1, 2017, 31 pages.

Saracco et al., "Theoretical grounds for the propagation of uncertainties in Monte Carlo particle transport", IEEE Transactions on Nuclear Science, vol. 61, Issue 2, Apr. 2014, pp. 877-887. http://ieeexplore.ieee.org/abstract/document/6758396/.

Levasseur et al., "Uncertainties in Parameters Estimated with Neural Networks: Application to Strong Gravitational Lensing", The Astrophysical Journal Letters, vol. 850, No. 1, Nov. 15, 2017, 6 pages.

Kendall, "Geometry and Uncertainty in Deep Learning for Computer Vision", University of Cambridge, Mar. 2017, 42 pages.

Owen, "Monte Carlo theory, methods and examples," Art Owen, 2013, 47 pages.

Li et al., "Time series prediction of stock price using deep belief networks with intrinsic plasticity", 29th Chinese Control and Decision Conference (CCDC), May 2017, 3 pages. Abstract Only. http://ieeexplore.ieee.org/abstract/document/7978707/?part=1.

Antonietti et al., "Model-Driven Analysis of Eyeblink Classical Conditioning Reveals the Underlying Structure of Cerebellar Plasticity and Neuronal Activity", IEEE Transactions on Neural Networks and Learning Systems, vol. 28, Issue 11, Nov. 2017, 15 pages.

Neftci et al., "Event-driven random backpropagation: Enabling neuromorphic deep learning machines", 2017 IEEE International Symposium on Circuits and Systems (ISCAS), May 2017, 3 pages. Abstract Only. http://ieeexplore.ieee.org/document/8050529/.

Medhi, "Multi-hour, multi-traffic class network design for virtual pat5h-based dynamically reconfigurable wide-area ATM networks", ACM Transactions on Networking, vol. 3, Issue 6, Dec. 1995, pp. 809-818.

Qian et al., "Estimating optimal cost of allocating virtualized resources with dynamic demand", Proceedings of the 23rd International Teletraffic Congress, Sep. 2011, pp. 320-321.

Huang et al., "Secure pairwise key establishment in large-scale sensor networks: An area partitioning and multigroup key predistribution approach", ACM Transactions on Sensor Networks, vol. 3, Issue 3, Aug. 2007, 32 pages.

PCT International Search Report, dated Jul. 3, 2019, regarding Application No. PCT/IB2019/051807, 9 pages.

Japan Patent Office, Office Action, dated Aug. 23, 2022, regarding Application No. JP2020-545254, 6 pages.

China National Intellectual Property Administration Office Action, dated Mar. 1, 2023, regarding Application No. CN201980009715.4, 5 pages.

* cited by examiner

EPISTEMIC AND ALEATORIC DEEP PLASTICITY BASED ON SOUND FEEDBACK

BACKGROUND

1. Field

The disclosure relates generally to deep learning and more specifically to simulating uncertainty while training an artificial neural network so as to predict an ability of the neural network to produce accurate results amidst uncertainty during later real-world application.

2. Description of the Related Art

Deep learning is a branch of machine learning based on a set of algorithms that attempts to model high-level abstractions in data by using artificial neural network architectures composed of multiple non-linear transformations. This machine learning can be supervised or unsupervised. Deep learning architectures have been applied to fields, such as, for example, audio recognition, computer vision, speech recognition, and natural language processing, where these architectures have produced results comparable to and in some cases superior to human experts.

Deep learning uses a cascade of multiple layers of processing nodes for feature extraction and transformation. Each successive layer of nodes uses the output from the previous layer of nodes as input. The deep architecture is organized as a graph. The nodes in the graph are connected by edges or links to propagate activation, calculated at the origin, to the destination nodes. Each edge has a weight that determines the relative strength and sign of the connection and each node applies an activation function to all of the weighted sum of incoming activations. The activation function is given as a hard threshold, a sigmoid function, or a hyperbolic tangent, for example.

Such deep architectures learn progressively and improve performance on tasks by considering examples, generally without task-specific programming. For example, in audio recognition, these deep architectures might learn to identify sounds that indicate panic in a crowd of people by analyzing sound samples that have been manually labeled as "panic" or "no panic" and using the results to identify panicked crowds in other sound inputs. These deep architectures are able to do this without any prior knowledge about crowds of people. Instead, these deep architectures evolve their own set of relevant characteristics from the training data that they process. However, current deep architecture models do not perform well in real-world environments due to errors in measurements or not accounting for what the current models don't know. In other words, these current deep architecture models do not perform well under high levels and ever-changing magnitudes of uncertainty in real-world environments.

SUMMARY

According to one illustrative embodiment, a computer-implemented method for simulating uncertainty in an artificial neural network is provided. A computer simulates aleatoric uncertainty to measure what the artificial neural network does not understand from sensor data received from an object operating in a real-world environment by adding random values to edge weights between nodes in the artificial neural network during backpropagation of output data of the artificial neural network and measuring impact on the output data by the added random values to the edge weights between the nodes. The computer simulates epistemic uncertainty to measure what the artificial neural network does not know by dropping out a selected node from each respective layer of the artificial neural network during forward propagation of the sensor data and measuring impact of dropped out nodes on the output data of the artificial neural network. The computer performs an action corresponding to the object sending the sensor data and operating in the real-world environment based on the impact of simulating the aleatoric uncertainty and the epistemic uncertainty. According to other illustrative embodiments, a computer system and computer program product for simulating uncertainty in an artificial neural network are provided. Thus, illustrative embodiments are able to perform during data and sensor uncertainty across many various types of platforms, such as autonomous vehicles, robotic assistants, drones, and the like, which operate in real-world environments. As a result, illustrative embodiments are able to increase performance of these various types of platforms while performing during data and sensor uncertainty in their respective environments.

According to yet another illustrative embodiment, a computer-implemented method for simulating uncertainty in an artificial neural network is provided. A computer simulates aleatoric uncertainty to measure what the artificial neural network does not understand from sensor data received from an object operating in a real-world environment by adding random values to edge weights between nodes in the artificial neural network during backpropagation of output data of the artificial neural network and measuring impact on the output data by the added random values to the edge weights between the nodes. The computer performs an action corresponding to the object sending the sensor data and operating in the real-world environment based on the impact of simulating the aleatoric uncertainty.

According to yet another illustrative embodiment, a computer-implemented method for simulating uncertainty in an artificial neural network is provided. A computer simulates epistemic uncertainty to measure what the artificial neural network does not know by dropping out a selected node from each layer of the artificial neural network during forward propagation of data corresponding to an object operating in a real-world environment and measuring impact of dropped out nodes on an output of the artificial neural network. The computer performs an action corresponding to the object operating in the real-world environment based on the impact of simulating the epistemic uncertainty.

These alternative illustrative embodiments decrease computer resource usage by only simulating either aleatoric uncertainty or epistemic uncertainty. In addition, both sensor uncertainty and data uncertainty may not exist in a real-world application. As a result, these alternative illustrative embodiments are better suited for performing in circumstances when only sensor uncertainty or only data uncertainty exists.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
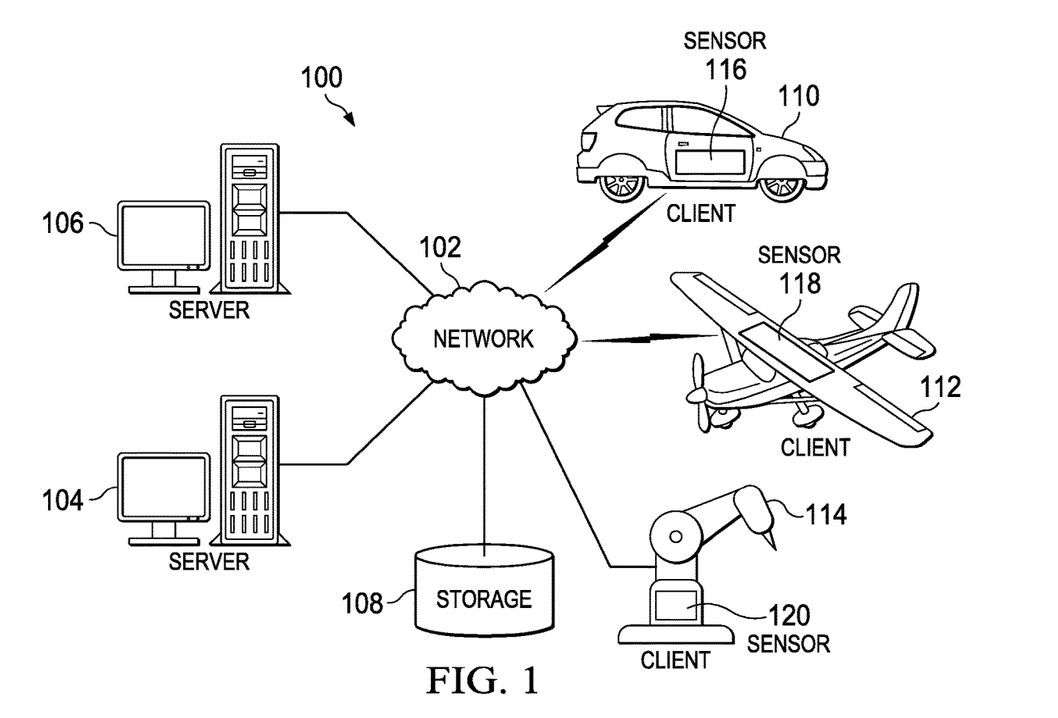
FIG. 1 is a pictorial representation of a network of data processing systems in which illustrative embodiments may be implemented.
Figure 2:
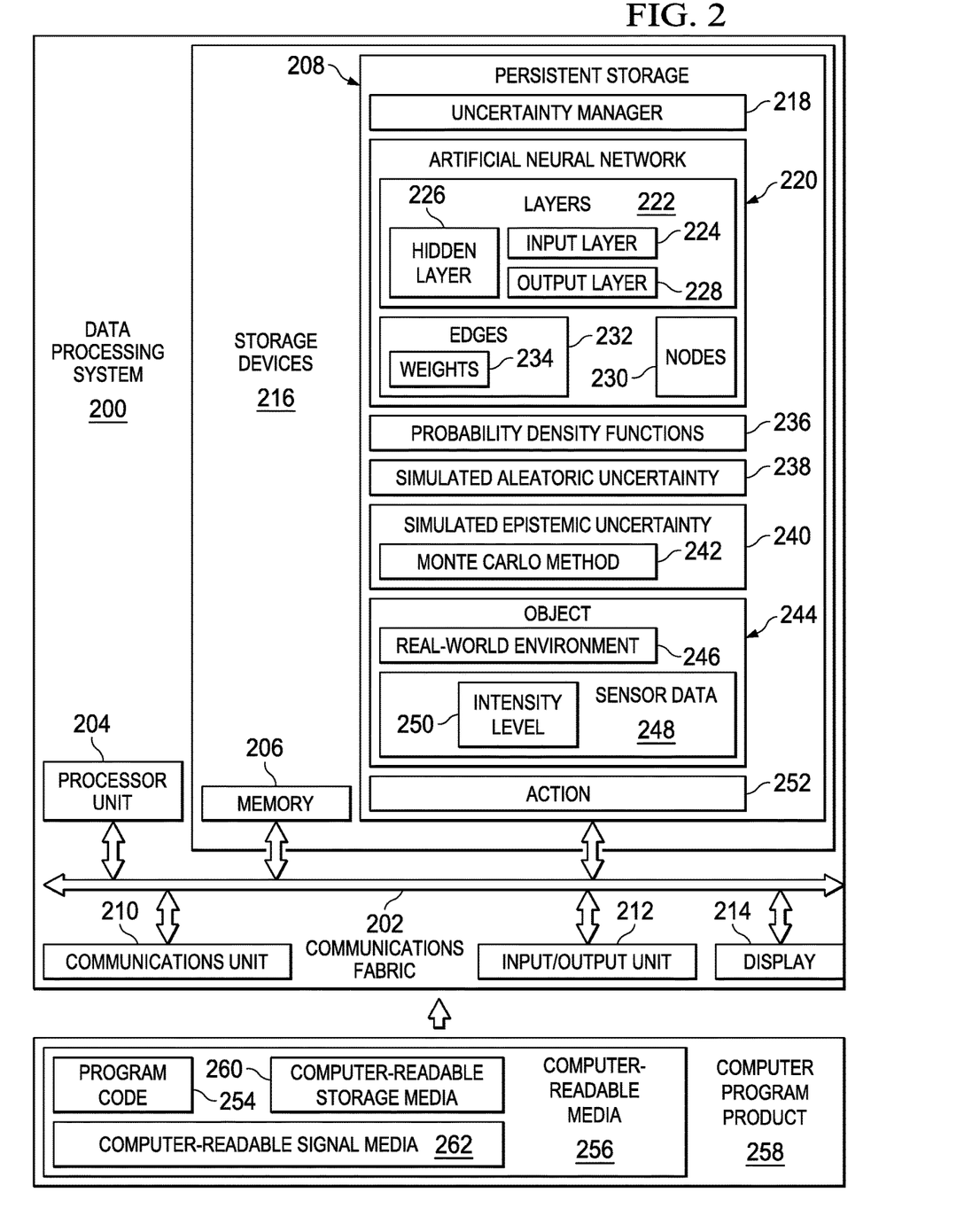
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of services to clients 110, 112, and 114. For example, server 104 and server 106 may simulate aleatoric and epistemic uncertainty in an artificial neural network to produce accurate outputs during uncertainty in real-world environments where clients 110, 112, and 114 operate. Further, it should be noted that server 104 and server 106 may each represent a cluster of servers in a datacenter. Alternatively, server 104 and server 106 may be servers in a cloud environment. Further, server 104 and server 106 may provide other information, such as applications and programs, to clients 110, 112, and 114.

Client 110, client 112, and client 114 also connect to network 102. Clients 110, 112, and 114 are clients of server 104 and/or server 106. In this example, clients 110, 112, and 114 are illustrated as a vehicle, an aircraft, and a robot, respectively, with wireless and wire communication links to network 102. However, it should be noted that clients 110, 112, and 114 are meant as examples only. In other words, clients 110, 112, and 114 may include other types of devices or machines, such as, for example, watercraft, computers, smart phones, smart watches, smart televisions, smart appliances, gaming devices, kiosks, and the like, with wire or wireless communication links to network 102.

Furthermore, client 110, client 112, and client 114 include sensor 116, sensor 118, and sensor 120, respectively. Sensor 116, sensor 118, and sensor 120 each represent a set of one or more sensors. The set of sensors may include, for example, imaging sensors, such as still and video cameras, sound capturing sensors, such as microphones, geolocation sensors, such as global positioning system (GPS) transceivers, light detection and ranging (LiDAR) sensors, radar sensors, and the like.

Clients 110, 112, and 114 transmit sensor data obtained from sensors 116, 118, and 120 regarding their respective real-world operating environments to server 104 and/or server 106 for evaluation of unknown events or circumstances occurring within their respective environments. Server 104 and/or server 106 input the sensor data into a trained artificial neural network, which simulates the aleatoric and epistemic uncertainties, to produce an accurate output. Based on the output generated by the trained artificial neural network, server 104 and/or server 106 may perform an action based on the output being outside of normal ranges for a particular environment. An action may be for server 104 to send an alert to an operator of client 110. Another action may be for server 106 to automatically take control of client 112.

Storage 108 is a network storage device capable of storing any type of data in a structured format or an unstructured format. In addition, storage 108 may represent a plurality of network storage devices. Further, storage 108 may store identifiers for a plurality of clients; artificial neural networks; probability density functions; and the like. Furthermore, storage unit 108 may store other types of data, such as authentication or credential data that may include user names, passwords, and biometric data associated with system users and administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on communications server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. Alternatively, data processing system 200 may be implemented in a device or machine, such as, for example, client 110 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may include a graphics processing unit.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores uncertainty manager 218. However, it should be noted that even though uncertainty manager 218 is illustrated as residing in persistent storage 208, in an alternative illustrative embodiment uncertainty manager 218 may be a separate component of data processing system 200. For example, uncertainty manager 218 may be a hardware component coupled to communication fabric 202 or a combination of hardware and software components. In another alternative illustrative embodiment, a first portion of uncertainty manager 218 may be located in data processing system 200 and a second portion of uncertainty manager 218 may be located in a second data processing system, such as server 106 or client 112 in FIG. 1. In yet another alternative illustrative embodiment, uncertainty manager 218 may be located in client devices instead of, or in addition to, data processing system 200.

Uncertainty manager 218 controls the process of simulating aleatoric and epistemic uncertainty in artificial neural network 220 to produce an output with increased accuracy during uncertainty in a real-world environment. Uncertainty describes a situation involving ambiguous and/or unknown information. In other words, uncertainty is the lack of certainty or a state of limited knowledge where it is impossible to exactly describe the current state, a future outcome, or more than one possible outcome. Uncertainty quantification is the quantitative characterization and reduction of uncertainties in both computational and real-world applications to determine how likely certain outcomes are if some aspects of the system are not exactly known. Measurement of uncertainty may include a set of possible states or outcomes where probabilities are assigned to each possible state or outcome. This also may include the application of a probability density function to continuous variables.

Uncertainty may be classified into two categories. One category is aleatoric uncertainty and the other category is epistemic uncertainty. Aleatoric uncertainty is related to statistical uncertainty and is representative of unknowns that differ each time the same process or experiment is run. Aleatoric uncertainty measures what cannot be understood from the data, but can be explained by unlimited sensing. For example, occlusions in a sensor image may occur so a model, such as artificial neural network 220, does not have all the needed information from the sensors. For example, an autonomous vehicle may need to know the distance to a tollbooth, but the autonomous vehicle's imaging sensor cannot detect the tollbooth because a semi-tractor trailer is in front of the vehicle occluding the tollbooth from the imaging sensor. As a result, what the model does not understand from the data needs to be measured and unlimited sensing needs to be emulated.

Epistemic uncertainty is related to systemic errors or measuring inaccuracy. Epistemic uncertainty measures what a model does not know, but can be explained by unlimited data. For example, a model may not know certain data, such as drag (e.g., air resistance) on an object falling to earth at 32 feet per second squared. As another example, a model may receive inaccurate data from a sensor because the sensor is not functioning properly due to malfunction or interference. As a result, what the model does not know from the data needs to be measured and unlimited data needs to be emulated.

In real-life applications, both kinds of uncertainty are typically present. In other words, typically in real-life applications both data uncertainty and sensor uncertainty exist. Uncertainty quantification works toward reducing epistemic uncertainties to aleatoric uncertainties. The quantification of aleatoric uncertainties can be relatively straightforward to perform depending on the application. Techniques such as Monte Carlo methods are frequently used. Monte Carlo methods are computational algorithms that randomly select a data subset from a set of data. Monte Carlo methods are useful for modeling phenomena with significant uncertainty in inputs. In other words, the objective of Monte Carlo sampling is to better understand a system through random sampling of data. Illustrative embodiments may utilize Monte Carlo methods to generate random draws from probability distributions. In this case, Monte Carlo sampling provides data for simulating the epistemic uncertainty.

A probability distribution provides probabilities of occurrence of different possible outcomes in a process or experiment. In other words, a probability distribution is a description of a random phenomenon in terms of the probabilities of events. A probability distribution is defined in terms of the sample space, which is the set of all possible outcomes of the random phenomenon being observed. A continuous probability distribution is typically described by probability density functions.

A probability density function of a continuous random variable is a function whose value at any given sample or point in the sample space (i.e., set of possible values taken by the continuous random variable) can be interpreted as providing a relative likelihood that the value of the random variable would equal that sample. In other words, while the absolute likelihood for a continuous random variable to take on any particular value is zero (0) since there are an infinite set of possible values to begin with, the value of the probability density function at two different samples can be used to infer, in any particular draw of the random variable, how much more likely it is that the random variable would equal one sample compared to the other sample. Thus, the probability density function is used to specify the probability of the random variable falling within a particular range of values instead of taking on any one value.

Uncertainty manager 218 simulates aleatoric uncertainty to measure what artificial neural network 220 cannot understand from the sensor data by emulating unlimited sensing. Uncertainty manager 218 emulates unlimited sensing by adding random values to edge weights between nodes in the artificial neural network 220 during backpropagation of output data of artificial neural network 220 and measuring the impact on the output data by the added random edge weight values between the nodes. In other words, uncertainty manager 218 makes weight adjustments to edges between nodes to compensate for lack of sensor data.

Uncertainty manager 218 simulates epistemic uncertainty to measure what artificial neural network 220 does not know by emulating unlimited data. Uncertainty manager 218 emulates unlimited data by dropping out random nodes from each layer in artificial neural network 220 during forward propagation of the sensor data and measuring the impact of the dropped out random nodes on outputs of artificial neural network 220. In other words, uncertainty manager 218 takes out nodes creating "internal lesions" in artificial neural network 220 to compensate for lack of data. Uncertainty manager 218 selects nodes to be randomly dropped out from each layer in artificial neural network 220 by using input sensor data, such as a set of one or more sounds or noises and/or a set of one or more images from a set of one or more sensors, corresponding to a real-world environment for Monte Carlo dropout sampling. For each respective layer of artificial neural network 220, uncertainty manager 218 identifies a probability density function in probability density functions 236 that corresponds to a particular layer and selects a node to be dropped out in that particular layer based on applying an intensity level of the sensor data (e.g., sound) input into the identified probability density function.

Probability density functions 236 include a plurality of different types of probability density functions. In addition, each respective hidden layer in artificial neural network 220 corresponds to a different type of probability density function in probability density functions 236. The different types of probability density functions in probability density functions 236 may include, for example, a Wrapped Cauchy probability density function (PDF), a Weibull_max PDF, a Weibull_min PDF, a Wald PDF, a Venmises PDF, a Tukey-Lambda PDF, a T PDF, a Semicircular PDF, a Rayleigh PDF, an Rdist PDF, a Pearson3 PDF, a Mielke PDF, a Maxwell PDF, a Logistic PDF, a Laplace PDF, a Hyesecant PDF, a Gamma PDF, a Gennorm PDF, a Foldnorm PDF, a Fisk PDF, a Cosine PDF, a Chi PDF, an Arcsine PDF, an Anglit PDF, an Alpha PDF, and the like.

Uncertainty manager 218 generates an output of artificial neural network 220 based on the simulated aleatoric and epistemic uncertainties. Uncertainty manager 218 utilizes the output of artificial neural network 220 to determine whether to perform an action based on the output, which takes into account the uncertainty in the real-world environment. The action performed by uncertainty manager 218 may be, for example, issuing an alert to an operator or user of an object, such as a device or machine, which is sending the sensor data as input to artificial neural network 220 and is operating in the real-world environment. Alternatively, the action performed by uncertainty manager 218 may be to take control of the device or machine operating in the real-world environment to manage, control, mitigate, or eliminate effects of the uncertainty and, therefore, increase performance of the device or machine in the real-world environment. The device or machine may be, for example, an autonomous or semi-autonomous vehicle, such as a car, truck, van, bus, train, and the like, an autonomous or semi-autonomous aircraft, such as a plane, jet, helicopter, drone, and the like, an autonomous or semi-autonomous watercraft, such as a boat, ship, submarine, and the like, an autonomous or semi-autonomous robotic assistant, such as an industrial robotic assistant, a surgical robotic assistant, a military robotic assistant, a household robotic assistant, and the like.

Artificial neural network 220 is a data processing algorithm. In an alternative illustrative embodiment, artificial neural network 220 is a hardware processing device. Artificial neural network 220 may represent any type of artificial neural network, such as, for example, a residual neural network, a convolutional neural network, a recurrent neural network, a stochastic neural network, and the like.

Artificial neural network 220 is organized into a plurality of layers, such as layers 222. Layers 222 include input layer 224, hidden layers 226, and output layer 228. Each layer in layers 222 consists of a number of interconnected nodes, such as nodes 230, which contain an activation function. An activation function of a node defines the output of that node given the input. Data patterns are presented to artificial neural network 220 via input layer 224, which communicates to one or more hidden layers in hidden layers 226 where the actual data processing is performed via weighted edges or connections, such as edges 232 that include weights 234, between nodes 230. Hidden layers 226 are internal representations of the input data. Hidden layers 226 then link to output layer 228 where an answer is output.

Artificial neural network 220 modifies weights 234 of edges 232 according to the input data patterns that artificial neural network 220 is presented with. Artificial neural network 220 learns via a supervised process that occurs with each epoch or cycle (i.e., each time uncertainty manager 218 runs artificial neural network 220 with a new input data pattern) through a forward activation flow of outputs, and the backpropagation of weight adjustments. In other words, this is a two-step process where uncertainty manager 218 feeds the data inputs into artificial neural network 220 via forward propagation and multiplied with initially random weights before they are transformed via an activation function. Once the forward propagation is complete, the backpropagation step measures the error from the final output to the expected output by calculating the derivatives of weights 234 generating the error and adjusts them. In other words, backpropagation adjusts the weights by calculating the gradient of a loss function. Once the weights are adjusted, artificial neural network 220 repeats the process of the forward propagation and backpropagation steps to minimize the error rate until convergence.

More simply, when artificial neural network 220 is initially presented with a data pattern, artificial neural network 220 makes a random guess as to what it might be. Artificial neural network 220 then determines how far its answer was from the actual one and makes an appropriate adjustment to weights 234 of edges 232. Within each hidden layer node is an activation function, such as a sigmoid function, linear function, or rectified linear unit, which polarizes network activity and helps it to stabilize. Once artificial neural network 220 is trained, uncertainty manager 218 utilizes artificial neural network 220 as an analytical tool to generate simulated aleatoric uncertainty 238 and simulated epistemic uncertainty 240. Uncertainty manager 218 utilizes Monte Carlo method 242 to generate simulated epistemic uncertainty 240. The output of a forward propagation run is then the predicted model for the data, which replaces previous values.

Object 244 represents the device or machine operating in real-world environment 246. Object 244 is connected to data processing system 200 via a network, such as network 102 in FIG. 1. Object 244 may be, for example, client 114 in FIG. 1, which is illustrated as a robotic device. In this case, real-world environment 246 may be an industrial production line, for example. Object 244 includes at least one sensor, such as sensor 120 in FIG. 1, which generates sensor data 248. Sensor data 248 is information corresponding to real-world environment 246.

In addition, object 244 sends sensor data 248 as input to artificial neural network 220. Sensor data 248 may be, for example, sound or audio data picked up by a sensor, such as a microphone, connected to object 244, which is operating in real-world environment 246. Sensor data 248 also includes intensity level 250. Intensity level 250 represents a level of intensity corresponding to sensor data 248. For example, a sound intensity level or acoustic intensity level is the level of the intensity of a sound relative to a reference value.

Based on the output of artificial neural network 220, uncertainty manager 218 performs action 252 in response to the output being outside normal or expected values for real-world environment 246. For example, uncertainty manager 218 may send an alert to an operator or user of object 244. Alternatively, uncertainty manager 218 may take over operational control of object 244 to, for example, prevent or reduce damage to object 244 or other objects or humans in real-world environment 246, increase performance of object 244, decrease a level of risk to object 244 or humans in real-world environment 246, warn humans of an unknow event in real-world environment 246, and the like.

Communications unit 210, in this example, provides for communication with other computers, data processing systems, devices, and machines via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The fields of data science and artificial intelligence are entering into a golden age ushered in by deep learning. Deep learning neural networks are just beginning to leverage techniques of reinforcement to learn from their environment. However, current models are not able to perform well in real-world environments due to errors in measurement or accounting for what current models don't know. Illustrative embodiments provide life-like training environments that resemble real-world application. Using illustrative embodiments, artificial neural networks are capable of reasoning under high levels and ever-changing magnitudes of uncertainty and humans will have a better idea of how these artificial neural networks will perform during uncertainty.

Illustrative embodiments provide a way to simulate aleatoric and epistemic uncertainty through deep learning plasticity. Further, illustrative embodiments determine the type of unknown event or disruption in the real-world environment using sensor feedback, such as sound data, obtained from the real-world environment. Thus, illustrative embodiments are able to perform during data and sensor uncertainty across many various types of platforms, such as autonomous vehicles, robotic assistants, drones, and the like. In fact, each training epoch of artificial neural networks using illustrative embodiments will uncover new results or outcomes due to uncertainty.

Figure 3:
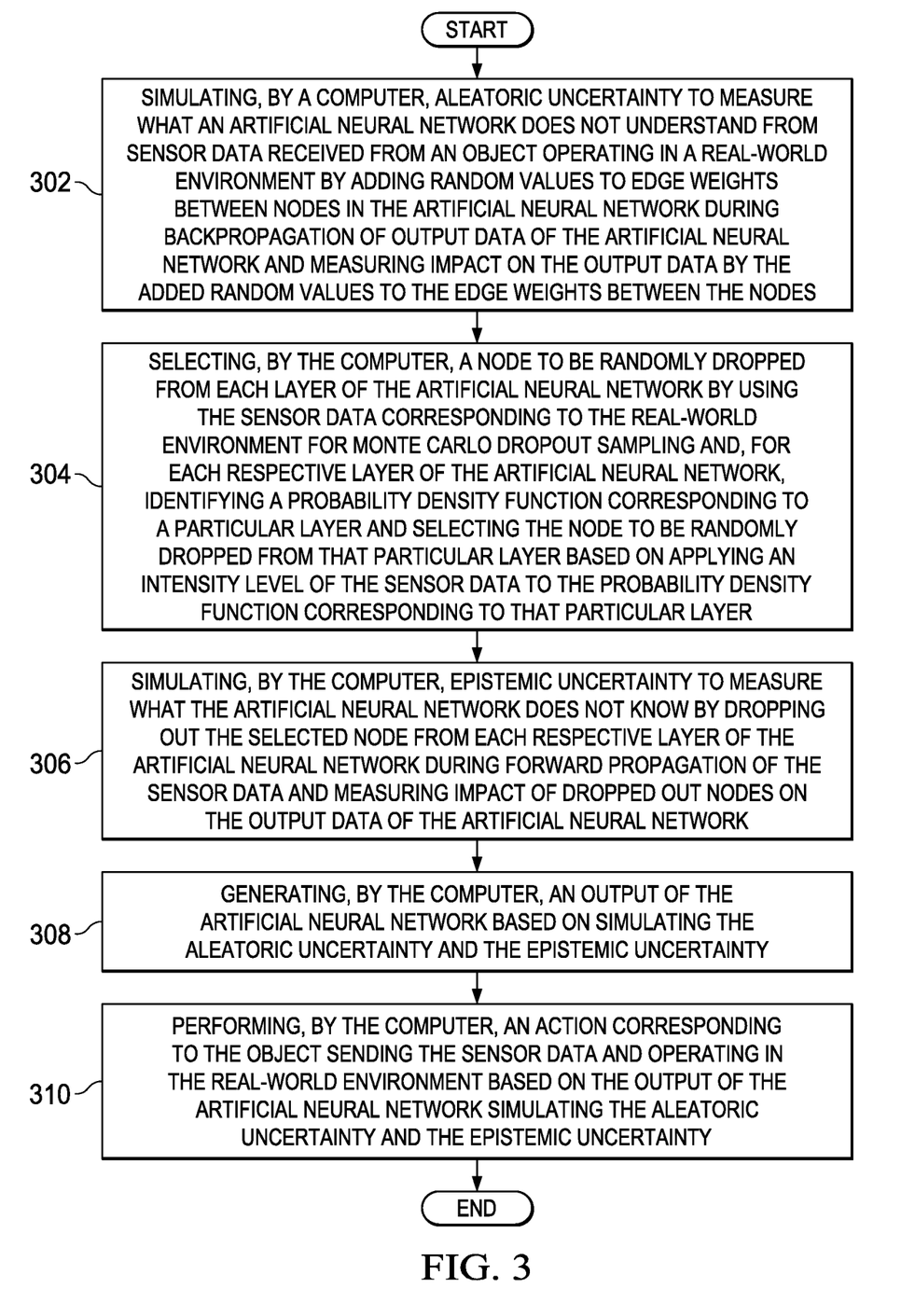
FIG. 3 is a flowchart illustrating a process for performing an action based on output of a trained artificial neural network simulating uncertainty in accordance with an illustrative embodiment.

With reference now to FIG. 3, a flowchart illustrating a process for performing an action based on output of a trained artificial neural network simulating uncertainty is shown in accordance with an illustrative embodiment. The process shown in FIG. 3 may be implemented in a computer, such as, for example, server 104 in FIG. 1 or data processing system 200 in FIG. 2. Alternatively, the process shown in FIG. 3 may be implemented in a device or machine, such as client 110 in FIG. 1, that includes some type of data processing system or computer.

The process begins when the computer simulates aleatoric uncertainty to measure what an artificial neural network does not understand from sensor data received from an object operating in a real-world environment by adding random values to edge weights between nodes in the artificial neural network during backpropagation of output data of the artificial neural network and measuring impact on the output data by the added random values to the edge weights between the nodes (step 302). The computer selects a node to be randomly dropped from each layer of the artificial neural network by using the sensor data corresponding to the real-world environment for Monte Carlo dropout sampling and, for each respective layer of the artificial neural network, the computer identifies a probability density function corresponding to a particular layer and selects the node to be randomly dropped from that particular layer based on applying an intensity level of the sensor data to the probability density function corresponding to that particular layer (step 304).

The computer simulates epistemic uncertainty to measure what the artificial neural network does not know by dropping out the selected node from each respective layer of the artificial neural network during forward propagation of the sensor data and measuring impact of dropped out nodes on the output data of the artificial neural network (step 306). The computer generates an output of the artificial neural network based on simulating the aleatoric uncertainty and the epistemic uncertainty (step 308). The computer performs an action corresponding to the object sending the sensor data and operating in the real-world environment based on the output of the artificial neural network simulating the aleatoric uncertainty and the epistemic uncertainty (step 310). Thereafter, the process terminates.

However, it should be noted that both data uncertainty and sensor uncertainty may not exist in all real-life applications. As a result, one alternative illustrative embodiment may only simulate aleatoric uncertainty to measure what an artificial neural network does not understand from sensor data received from an object operating in a real-world environment when only sensor uncertainty exists. Another alternative illustrative embodiment may only simulate epistemic uncertainty to measure what an artificial neural network does not know from data corresponding to an object operating in a real-world environment when only data uncertainty exists. Further, by alternative illustrative embodiments only simulating either aleatoric uncertainty or epistemic uncertainty, these alternative illustrative embodiments conserve processor, memory, and network resources as compared to simulating both aleatoric and epistemic uncertainties.

Figure 4:
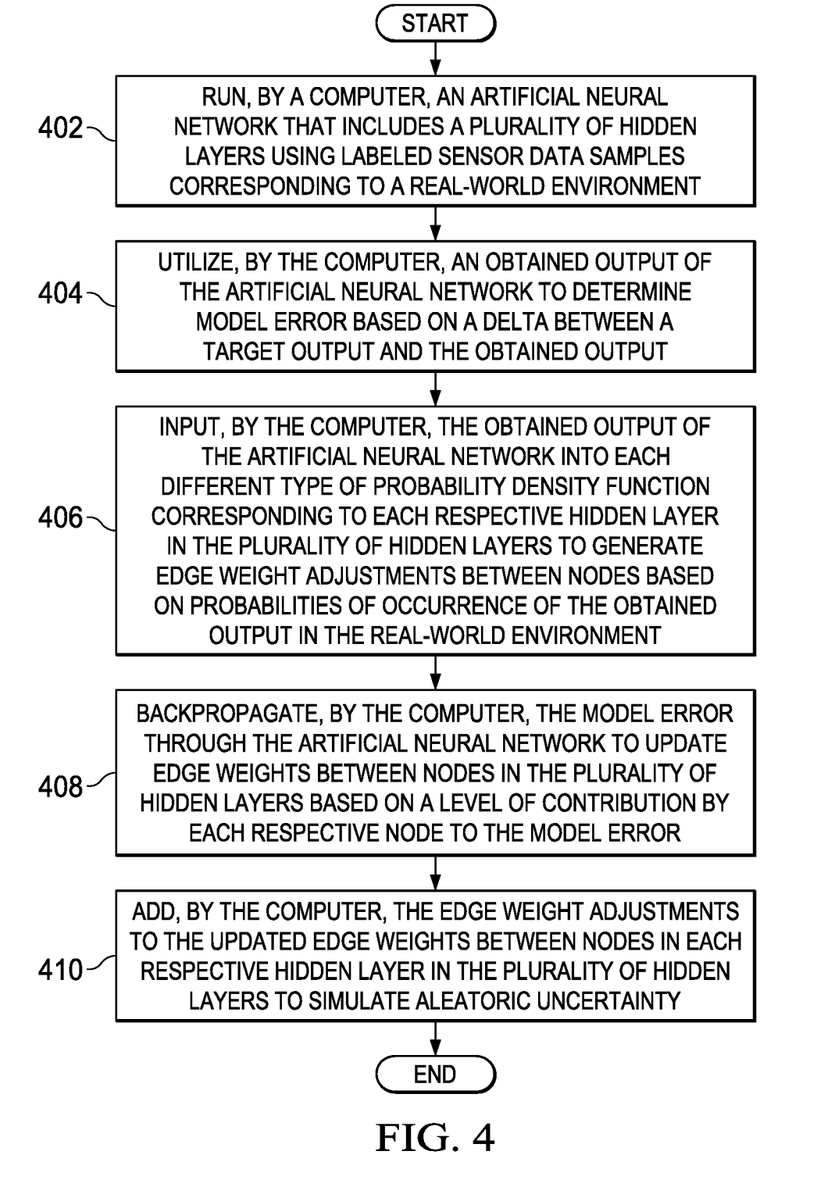
FIG. 4 is a flowchart illustrating a process for simulating aleatoric uncertainty in accordance with an illustrative embodiment.

With reference now to FIG. 4, a flowchart illustrating a process for simulating aleatoric uncertainty is shown in accordance with an illustrative embodiment. The process shown in FIG. 4 may be implemented in a computer, such as, for example, server 106 in FIG. 1 or data processing system 200 in FIG. 2. Alternatively, the process shown in FIG. 4 may be implemented in a device or machine, such as client 112 in FIG. 1, that includes some type of data processing system or computer.

An artificial neural network learns by backpropagating a loss function or error, which is the difference between a target output and an obtained output, through the artificial neural network. Illustrative embodiments update the weights on each of the edges between nodes in the artificial neural network based on the amount of contribution that each node had on the error. Through simulating aleatoric uncertainty, illustrative embodiments add a weight adjustment (e.g., epsilon) to the updated weights using the following formula:

$$w_{new}^{[L](l)} = w_{old}^{[L](l)} + \alpha \frac{dJ}{d} + \epsilon \frac{dJ}{d}.$$

In other words, illustrative embodiments utilize epsilon as a multiplier for the error. Illustrative embodiments retrieve the value for epsilon from each different probability density function corresponding to each respective hidden layer of the artificial neural network. Illustrative embodiments may utilize a plurality of different types of probability density functions, such as, for example, thirty different types corresponding to thirty different hidden layers of the artificial neural network.

The process begins when the computer runs an artificial neural network that includes a plurality of hidden layers using labeled sensor data samples corresponding to a real-world environment (step 402). The computer utilizes an obtained output of the artificial neural network to determine model error based on a delta between a target output and the obtained output (step 404). The computer inputs the obtained output of the artificial neural network into each different type of probability density function corresponding to each respective hidden layer in the plurality of hidden layers to generate edge weight adjustments between nodes based on probabilities of occurrence of the obtained output in the real-world environment (step 406).

The computer backpropagates the model error through the artificial neural network to update edge weights between nodes in the plurality of hidden layers based on a level of contribution by each respective node to the model error (step 408). The computer adds the edge weight adjustments to the updated edge weights between nodes in each respective hidden layer in the plurality of hidden layers to simulate aleatoric uncertainty (step 410). Thereafter, the process terminates.

Figure 5:
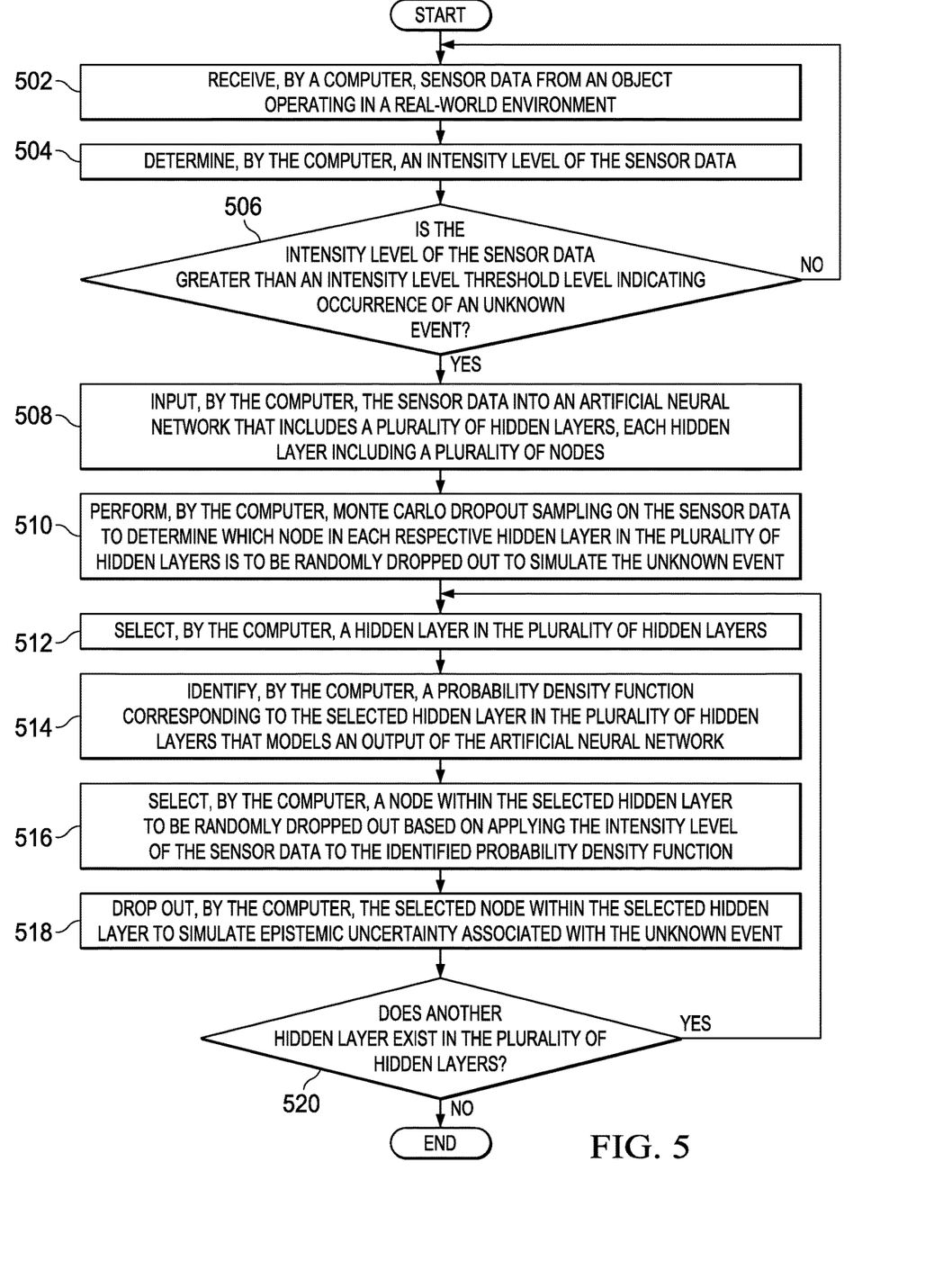
FIG. 5 is a flowchart illustrating a process for simulating epistemic uncertainty in accordance with an illustrative embodiment.

With reference now to FIG. 5, a flowchart illustrating a process for simulating epistemic uncertainty is shown in accordance with an illustrative embodiment. The process shown in FIG. 5 may be implemented in a computer, such as, for example, server 104 in FIG. 1 or data processing system 200 in FIG. 2. Alternatively, the process shown in FIG. 5 may be implemented in a device or machine, such as client 114 in FIG. 1, that includes some type of data processing system or computer.

Illustrative embodiments may utilize, for example, sound-based dropout sampling to model epistemic uncertainty. Illustrative embodiments may utilize a sound print obtained from a real-world environment to set the dropout learning rate for each hidden layer in the artificial neural network. For example, illustrative embodiments may utilize a sound analyzer to measure the noise from a crowd of people in the real-world environment to generate multiple tags corresponding to the noise. Illustrative embodiments may input the tags into a word2vector neural network to generate word vectors and then enter the word vectors into a sound intensity classifier, along with a phonograph of the crowd noise. The resultant noise intensity score generated by the sound intensity classifier provides the magnitude of sampling during Monte Carlo dropout sampling. The magnitude of sampling is first related to the number of nodes to be dropped out of the artificial neural network and then to how many samples to take. As a result, during training, the artificial neural network will emulate a loss of nodes that simulate what the artificial neural network does not know. The output of the trained artificial neural network will contain epistemic error evaluation.

The process begins when the computer receives sensor data from an object operating in a real-world environment (step 502). The computer determines an intensity level of the sensor data (step 504). The computer determines whether the intensity level of the sensor data is greater than an intensity level threshold level indicating occurrence of an unknown event (step 506).

If the computer determines that the intensity level of the sensor data is less than the intensity level threshold level indicating occurrence of an unknown event, no output of step 506, then the process returns to step 502 where the computer continues to receive sensor data. If the computer determines that the intensity level of the sensor data is greater than or equal to the intensity level threshold level indicating occurrence of an unknown event, yes output of step 506, then the computer inputs the sensor data into an artificial neural network that includes a plurality of hidden layers, each hidden layer including a plurality of nodes (step 508).

Afterward, the computer performs Monte Carlo dropout sampling on the sensor data to determine which node in each respective hidden layer in the plurality of hidden layers is to be randomly dropped out to simulate the unknown event (step 510). The computer selects a hidden layer in the plurality of hidden layers (step 512). The computer identifies a probability density function corresponding to the selected hidden layer in the plurality of hidden layers that models an output of the artificial neural network (step 514).

The computer selects a node within the selected hidden layer to be randomly dropped out based on applying the intensity level of the sensor data to the identified probability density function (step 516). The computer drops out the selected node within the selected hidden layer to simulate epistemic uncertainty associated with the unknown event (step 518). Subsequently, the computer makes a determination as to whether another hidden layer exists in the plurality of hidden layers (step 520).

If the computer determines that another hidden layer does exist in the plurality of hidden layers, yes output of step 520, then the process returns to step 512 where the computer selects another hidden layer. If the computer determines that another hidden layer does not exist in the plurality of hidden layers, no output of step 520, then the process terminates thereafter.

Figure 6:
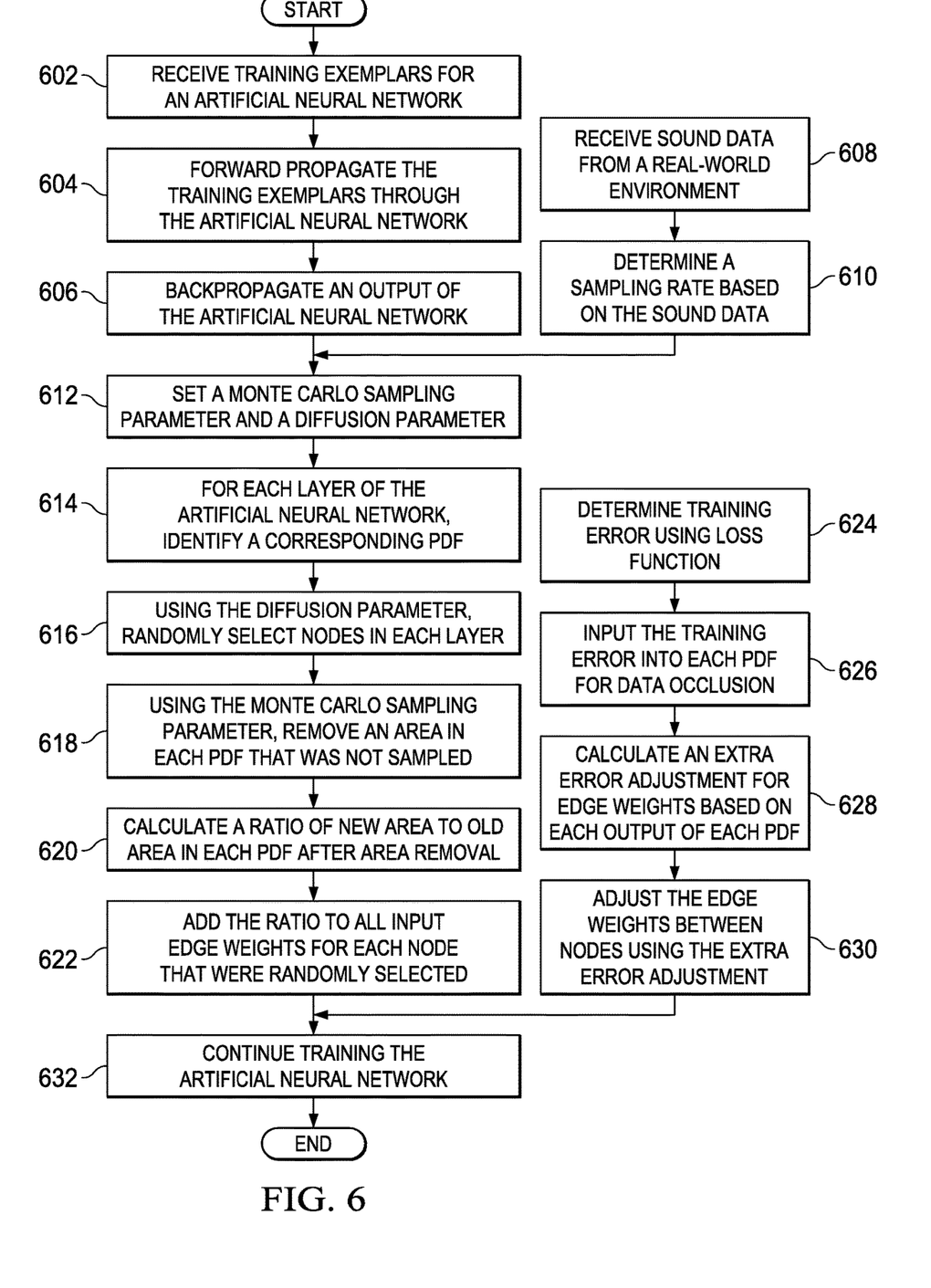
FIG. 6 is a flowchart illustrating a process for training an artificial neural network in accordance with an illustrative embodiment.

With reference now to FIG. 6, a flowchart illustrating a process for training an artificial neural network is shown in accordance with an illustrative embodiment. The process shown in FIG. 6 may be implemented in a computer, such as, for example, server 104 in FIG. 1 or data processing system 200 in FIG. 2. Alternatively, the process shown in FIG. 6 may be implemented in a device or machine, such as client 114 in FIG. 1, that includes some type of data processing system or computer.

The process begins when the computer receives training exemplars for an artificial neural network (step 602). The computer forward propagates the training exemplars through the artificial neural network (step 604). The computer backpropagates an output of the artificial neural network (step 606).

In addition, the computer receives sound data from a real-world environment (step 608). The computer determines a sampling rate based on the sound data (step 610). Afterward, the computer sets a Monte Carlo sampling parameter and a diffusion parameter based on backpropagation and the determined sampling rate (step 612).

For each layer of the artificial neural network, the computer identifies a corresponding probability density function (PDF) (step 614). Using the diffusion parameter, the computer randomly selects nodes in each layer of the artificial neural network (step 616). Using the Monte Carlo sampling parameter, the computer removes an area in each probability density function that was not sampled (step 618). The computer calculates a ratio of new area to old area in each probability density function after area removal (step 620). The computer adds the ratio to all input edge weights for each node that were randomly selected (step 622).

Further, the computer determines training error using a loss function (step 624). The computer inputs the training error into each probability density function for data occlusion (step 626). The computer calculates an extra error adjustment for edge weights based on each output of each probability density function (step 628). The computer adjusts the edge weights between nodes using the extra error adjustment (step 630).

The computer continues training the artificial neural network (step 632). The process terminates thereafter.

Thus, illustrative embodiments of the present invention provide a computer-implemented method, computer system, and computer program product for simulating uncertainty while training an artificial neural network so as to predict an ability of the neural network to produce accurate results amidst uncertainty during later real-world application. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for simulating uncertainty in an artificial neural network, the computer-implemented method comprising:
    simulating, by a computer, aleatoric uncertainty to measure what the artificial neural network does not understand from sensor data received from an object operating in a real-world environment by adding random values to edge weights between nodes in the artificial neural network during backpropagation of output data of the artificial neural network and measuring impact on the output data by the added random values to the edge weights between the nodes;
    simulating, by the computer, epistemic uncertainty to measure what the artificial neural network does not know by dropping out a selected node from each respective layer of the artificial neural network during forward propagation of the sensor data and measuring impact of dropped out nodes on the output data of the artificial neural network; and
    performing, by the computer, an action corresponding to the object sending the sensor data and operating in the real-world environment based on the impact of simulating the aleatoric uncertainty and the epistemic uncertainty.

2. The computer-implemented method of claim 1 further comprising:
    selecting, by the computer, a node to be randomly dropped from each layer of the artificial neural network by using the sensor data corresponding to the real-world environment for Monte Carlo dropout sampling; and
    for each respective layer of the artificial neural network:
        identifying, by the computer, a probability density function corresponding to a particular layer; and
        selecting, by the computer, the node to be randomly dropped from that particular layer based on applying an intensity level of the sensor data to the probability density function corresponding to that particular layer.

3. The computer-implemented method of claim 1 further comprising:
    generating, by the computer, an output of the artificial neural network based on simulating the aleatoric uncertainty and the epistemic uncertainty.

4. The computer-implemented method of claim 1 further comprising:
    running, by the computer, the artificial neural network that includes a plurality of hidden layers using labeled sensor data samples corresponding to the real-world environment; and
    utilizing, by the computer, an obtained output of the artificial neural network to determine model error based on a delta between a target output and the obtained output.

5. The computer-implemented method of claim 4 further comprising:
    inputting, by the computer, the obtained output of the artificial neural network into each different type of probability density function corresponding to each respective hidden layer in the plurality of hidden layers to generate edge weight adjustments between nodes based on probabilities of occurrence of the obtained output in the real-world environment.

6. The computer-implemented method of claim 5 further comprising:
    backpropagating, by the computer, the model error through the artificial neural network to update edge weights between nodes in the plurality of hidden layers based on a level of contribution by each respective node to the model error; and
    adding, by the computer, the edge weight adjustments to the updated edge weights between nodes in each respective hidden layer in the plurality of hidden layers to simulate the aleatoric uncertainty.

7. The computer-implemented method of claim 1 further comprising:
    receiving, by the computer, the sensor data from the object operating in the real-world environment;
    determining, by the computer, an intensity level of the sensor data; and
    determining, by the computer, whether the intensity level of the sensor data is greater than or equal to an intensity level threshold level indicating occurrence of an unknown event.

8. The computer-implemented method of claim 7 further comprising:
    responsive to the computer determining that the intensity level of the sensor data is greater than or equal to the intensity level threshold level indicating occurrence of an unknown event, inputting, by the computer, the sensor data into the artificial neural network that includes a plurality of hidden layers, each hidden layer including a plurality of nodes; and
    performing, by the computer, Monte Carlo dropout sampling on the sensor data to determine which node in each respective hidden layer in the plurality of hidden layers is to be randomly dropped out to simulate the unknown event.

9. The computer-implemented method of claim 8 further comprising:
    selecting, by the computer, a hidden layer in the plurality of hidden layers; and
    identifying, by the computer, a probability density function corresponding to the selected hidden layer in the plurality of hidden layers that models an output of the artificial neural network.

10. The computer-implemented method of claim 9 further comprising:
    selecting, by the computer, a node within the selected hidden layer to be randomly dropped out based on applying the intensity level of the sensor data to the identified probability density function; and
    dropping out, by the computer, the selected node within the selected hidden layer to simulate epistemic uncertainty associated with the unknown event.

11. A computer system for simulating uncertainty in an artificial neural network, the computer system comprising:
    a bus system;
    a storage device connected to the bus system, wherein the storage device stores program instructions; and
    a processor connected to the bus system, wherein the processor executes the program instructions to:
        simulate aleatoric uncertainty to measure what the artificial neural network does not understand from sensor data received from an object operating in a real-world environment by adding random values to edge weights between nodes in the artificial neural network during backpropagation of output data of the artificial neural network and measuring impact on the output data by the added random values to the edge weights between the nodes;

simulate epistemic uncertainty to measure what the artificial neural network does not know by dropping out a selected node from each respective layer of the artificial neural network during forward propagation of the sensor data and measuring impact of dropped out nodes on the output data of the artificial neural network; and perform an action corresponding to the object sending the sensor data and operating in the real-world environment based on the impact of simulating the aleatoric uncertainty and the epistemic uncertainty.

12. The computer system of claim 11, wherein the processor further executes the program instructions to:

select a node to be randomly dropped from each layer of the artificial neural network by using the sensor data corresponding to the real-world environment for Monte Carlo dropout sampling; and for each respective layer of the artificial neural network:
identify a probability density function corresponding to a particular layer; and
select the node to be randomly dropped from that particular layer based on applying an intensity level of the sensor data to the probability density function corresponding to that particular layer.

13. The computer system of claim 11, wherein the processor further executes the program instructions to:

generate an output of the artificial neural network based on simulating the aleatoric uncertainty and the epistemic uncertainty.

14. The computer system of claim 11, wherein the processor further executes the program instructions to:

run the artificial neural network that includes a plurality of hidden layers using labeled sensor data samples corresponding to the real-world environment; and utilize an obtained output of the artificial neural network to determine model error based on a delta between a target output and the obtained output.

15. The computer system of claim 14, wherein the processor further executes the program instructions to:

input the obtained output of the artificial neural network into each different type of probability density function corresponding to each respective hidden layer in the plurality of hidden layers to generate edge weight adjustments between nodes based on probabilities of occurrence of the obtained output in the real-world environment.

16. A computer program product for simulating uncertainty in an artificial neural network, the computer program product comprising a computer readable storage medium having program instructions embodied therewith, the program instructions executable by a computer to cause the computer to perform a method comprising:

simulating, by the computer, aleatoric uncertainty to measure what the artificial neural network does not understand from sensor data received from an object operating in a real-world environment by adding random values to edge weights between nodes in the artificial neural network during backpropagation of output data of the artificial neural network and measuring impact on the output data by the added random values to the edge weights between the nodes;

simulating, by the computer, epistemic uncertainty to measure what the artificial neural network does not know by dropping out a selected node from each respective layer of the artificial neural network during forward propagation of the sensor data and measuring impact of dropped out nodes on the output data of the artificial neural network; and performing, by the computer, an action corresponding to the object sending the sensor data and operating in the real-world environment based on the impact of simulating the aleatoric uncertainty and the epistemic uncertainty.

17. The computer program product of claim 16 further comprising:

selecting, by the computer, a node to be randomly dropped from each layer of the artificial neural network by using the sensor data corresponding to the real-world environment for Monte Carlo dropout sampling; and for each respective layer of the artificial neural network:
identifying, by the computer, a probability density function corresponding to a particular layer; and
selecting, by the computer, the node to be randomly dropped from that particular layer based on applying an intensity level of the sensor data to the probability density function corresponding to that particular layer.

18. The computer program product of claim 16 further comprising:

generating, by the computer, an output of the artificial neural network based on simulating the aleatoric uncertainty and the epistemic uncertainty.

19. The computer program product of claim 16 further comprising:

running, by the computer, that artificial neural network that includes a plurality of hidden layers using labeled sensor data samples corresponding to the real-world environment; and utilizing, by the computer, an obtained output of the artificial neural network to determine model error based on a delta between a target output and the obtained output.

20. The computer program product of claim 19 further comprising:

inputting, by the computer, the obtained output of the artificial neural network into each different type of probability density function corresponding to each respective hidden layer in the plurality of hidden layers to generate edge weight adjustments between nodes based on probabilities of occurrence of the obtained output in the real-world environment.

21. The computer program product of claim 20 further comprising:

backpropagating, by the computer, the model error through the artificial neural network to update edge weights between nodes in the plurality of hidden layers based on a level of contribution by each respective node to the model error; and adding, by the computer, the edge weight adjustments to the updated edge weights between nodes in each respective hidden layer in the plurality of hidden layers to simulate the aleatoric uncertainty.

22. The computer program product of claim 16 further comprising:

receiving, by the computer, the sensor data from the object operating in the real-world environment;

determining, by the computer, an intensity level of the sensor data; and determining, by the computer, whether the intensity level of the sensor data is greater than or equal to an intensity level threshold level indicating occurrence of an unknown event.

23. The computer program product of claim 22 further comprising:

responsive to the computer determining that the intensity level of the sensor data is greater than or equal to the intensity level threshold level indicating occurrence of an unknown event, inputting, by the computer, the sensor data into the artificial neural network that includes a plurality of hidden layers, each hidden layer including a plurality of nodes; and performing, by the computer, Monte Carlo dropout sampling on the sensor data to determine which node in each respective hidden layer in the plurality of hidden layers is to be randomly dropped out to simulate the unknown event.

24. A computer-implemented method for simulating uncertainty in an artificial neural network, the computer-implemented method comprising:

simulating, by a computer, aleatoric uncertainty to measure what the artificial neural network does not understand from sensor data received from an object operating in a real-world environment by adding random values to edge weights between nodes in the artificial neural network during backpropagation of output data of the artificial neural network and measuring impact on the output data by the added random values to the edge weights between the nodes; and performing, by the computer, an action corresponding to the object sending the sensor data and operating in the real-world environment based on the impact of simulating the aleatoric uncertainty.

25. A computer-implemented method for simulating uncertainty in an artificial neural network, the computer-implemented method comprising:

simulating, by a computer, epistemic uncertainty to measure what the artificial neural network does not know by dropping out a selected node from each layer of the artificial neural network during forward propagation of data corresponding to an object operating in a real-world environment and measuring impact of dropped out nodes on an output of the artificial neural network; and performing, by the computer, an action corresponding to the object operating in the real-world environment based on the impact of simulating the epistemic uncertainty.

\* \* \* \* \*